Patented Sept. 30, 1947

2,428,317

UNITED STATES PATENT OFFICE 2,428,317

CLEANSING COMPOSITION

Edward J. Moran, Chicago, Ill.

No Drawing. Application December 22, 1944,
Serial No. 569,421

4 Claims. (Cl. 252—116)

This invention relates to a cleanser for glassware, china, porcelainware, tile, painted or varnished surfaces, woodwork, metalware, silver, jewelry, clothes and the like.

Specifically this invention relates to a cleanser containing titanium dioxide in water-dispersible form.

Titanium dioxide powders have heretofore been used in paints, lacquers, leather finishes, printing inks, shoe cleaners, paper, rubber, plastics and the like. In all of such materials, the titanium dioxide functioned as a pigment and, as such, it had to remain in or on the pigmented material.

The present invention now provides a soap or cleanser containing a water-dispersible titanium dioxide which is removed from the surface being cleaned. In the cleanser of the present invention the titanium dioxide is admixed with other ingredients such as ground silica or other scouring grit material and powdered soap or other detergent material. The titanium dioxide present in this cleanser functions to stabilize soap suds or foam, to absorb oil and grease, to neutralize the effect of alkalies on the skin, and to mask and lubricate the scouring grit particles while holding these particles on the surface being cleaned.

Suitable water-dispersible titanium dioxide powders for the cleansers of this invention are marketed that contain a minimum of 97% $TiO_2$ and are preferably surface-treated with wetting agents to increase the dispersibility of the $TiO_2$ in water. The powders are ground to a fineness such that 99.7% will pass through a 300-mesh screen. The powders have a high specific gravity range of 3.88 to 4.20, a very high water absorption capacity of from 33 to 50 lbs. of water per 100 lbs. of powder, and a high oil absorption capacity of from 17 to 21 lbs. of oil per 100 lbs. of powder.

Any suitable water-dispersing agent, such as the dioctyl ester of sodium sulfosuccinic acid, monobutyl diphenyl sodium monosulfonate, fatty alcohol sulfates or the like can be used to surface-treat titanium dioxide for increasing its dispersibility in water.

In the cleansers of this invention the titanium dioxide powder is so very fine that it can coat and mask the scouring grit particles, causing the grits to roll on each other, thereby eliminating scratching.

If desired, the cleansers of this invention can include agents such as water softeners, bleaches, and the like.

It is, therefore, an object of this invention to provide a cleanser containing titanium dioxide.

A further object of this invention is to provide a cleanser containing water-dispersible titanium dioxide which is removed from the surface being cleaned, to leave the surface in an unpigmented condition.

A further object of this invention is to provide a cleanser containing scouring material, a soap, titanium dioxide, and a wetting agent.

A specific object of this invention is to provide a cleanser containing ground silica, soap, and water-dispersible titanium dioxide.

Other and further objects of this invention will be apparent to those skilled in the art from the following examples which illustrate several preferred embodiments of the invention:

Example I

A cleanser suitable for mopping wood, tile, cement, linoleum and the like floors was made by mixing together a scouring material such as silica sand, powdered soap, and water-dispersible titanium dioxide. The following proportions by weight of ingredients were used:

| | Per cent |
|---|---|
| Ground silica (preferably 140 mesh or finer amorphous $SiO_2$) | 60 |
| Powdered vegetable oil soap | 30 |
| Water dispersible titanium dioxide containing 97% or more $TiO_2$ and a wetting agent | 10 |

The ingredients were thoroughly mixed in a dry state. The silica was coated with the titanium dioxide to become "lubricated" so as to roll between the fingers.

A dry powdered mixture of the above ingredients was sprinkled on the floor to be mopped and a water-wet mop was applied to the floor. The soap foamed up with the water, and the water dispersible titanium dioxide held the ground silica in contact with the floor while loosened dirt rose in the foam away from the floor. The loosened dirt was mopped up, the floor was rinsed, and the dried floor was clean and devoid of any pigmented film.

Example II

A composition suitable for washing glassware and dishes was made by mixing together the following ingredients on a dry weight basis:

| | Per cent |
|---|---|
| Powdered trisodium phosphate | 30 |
| Powdered vegetable oil soap | 10 |
| Ground silica (140 mesh or finer $SiO_2$) | 40 |
| Water dispersible titanium dioxide containing 97% or more $TiO_2$ and a wetting agent | 20 |

Two tablespoons of the composition were stirred up in a pan of warm dish water, china dishes and drinking glasses were washed in this water and rinsed with warm water. The glassware had a brilliant luster and was free from grease and dirt.

The trisodium phosphate acted as a water softener, and the soap foamed up into a stiff stable suds to act as a detergent. The titanium dioxide absorbed oil and greases, stabilized the soap suds, and lubricated the silica to provide a non-scratching scouring material. The trisodium phosphate was replaced with sodium metasilicate in another dish-washing powder according to this invention and similar results were obtained.

A cleaning rag suitable for cleaning eye-glass lenses can be provided by saturating a soft flannel rag with a water dispersion of the above ingredients. The rag is dried and the ingredients will remain in the rag to be an effective lens cleanser.

*Example III*

A washing powder for clothes was made with the following ingredients in the indicated proportions by weight:

| | Per cent |
|---|---|
| TiO₂ containing less than 1% water dispersing agent such as the dioctyl ester of sodium sulfosuccinic acid | 10 |
| Vegetable oil soap | 40 |
| Sodium sulphite | 30 |
| Ground silica | 20 |

The above powdered composition was mixed up into a washing machine tubful of hot water in an amount sufficient to form a good suds. Clothes were washed in the machine. The titanium dioxide and silica stabilized the suds, the sodium sulphite bleached the clothes, and the silica lubricated by the titanium dioxide did not wear the cloth.

*Example IV*

A cleanser for scouring pots, metalware and the like is made according to this invention from the following ingredients in the weight proportions indicated:

| | Per cent |
|---|---|
| 140-mesh silica (SiO₂) | 70 |
| Soap powder | 20 |
| Water-dispersible titanium dioxide | 10 |

The above ingredients were thoroughly admixed in a dry state and dispensed from a shake-type dispensing container like an ordinary kitchen cleanser.

Alternately, water could be admixed with the ingredients to provide a paste.

If a silver polish is desired, 10% of the silica in the formula can be replaced with 10% of whiting to produce a silver-cleaning powder or paste containing the following ingredients on a dry basis:

| | Per cent |
|---|---|
| Silica | 60 |
| Soap | 20 |
| Water-dispersible titanium dioxide | 10 |
| Whiting | 10 |

In the above examples, silica is specified as the scouring material. It should be understood, however, that the silica can be replaced with other scouring materials or abrasives such as, for example, kieselguhr, pumice, fuller's earth, chalk, clay, rouge, and the like.

While a vegetable oil soap is preferred, it should be understood that any soap can be used. A suitable vegetable oil soap powder is made by saponifying corn oil or soy bean oil with soda ash. The soap is preferably neutral, or very slightly on the acid side.

From the above examples and explanations it should be understood that the invention provides a cleanser which can be marketed in dry powdered form, in cake form, or in paste form, and which contains water-dispersible titanium dioxide. The titanium dioxide is not used as a pigment but is removed from the cleansed material by rinsing or the like.

It will, of course, be understood that various details of the product can be varied through a wide range without departing from the principles of this invention and it is, therefore, not the purpose to limit the patent granted hereon otherwise than necessitated by the scope of the appended claims.

I claim as my invention:

1. A cleansing composition in dry powdered form comprising 10 to 20% by weight water-dispersible titanium dioxide, 20 to 70% ground silica, and 10 to 40% soap, said titanium dioxide coating the ground silica particles to cause the particles to roll on each other and to hold the particles against an object being cleansed while stabilizing suds created by said soap when wet with water.

2. A cleansing composition in dry powdered form suitable for mopping up floors comprising 10% by weight water-dispersible titanium dioxide, 30% by weight soap, and 60% by weight ground silica, said titanium dioxide coating the ground silica particles to cause the silica particles to roll on each other for holding the particles on a floor being mopped while stabilizing suds created by the soap when wet with water.

3. A cleansing composition in dry powdered form suitable for washing glassware and dishes comprising 20% by weight water-dispersible titanium dioxide, 10% soap, 40% ground silica, and 30% of a water-softening agent selected from the group consisting of trisodium phosphate and sodium metasilicate, the particles of said silica being coated with said titanium dioxide to cause the silica particles to roll on each other and to hold the particles against an object being cleansed while stabilizing suds created by the soap when wet with water.

4. A cleansing composition in dry powdered form suitable for scouring metal which comprises about 10% by weight water-dispersible titanium dioxide, about 20% soap, and the remainder substantially all ground silica, the particles of said silica being coated with said titanium dioxide to cause the silica particles to roll on each other and to hold the particles against an object being cleansed while stabilizing suds created by the soap when wet with water.

EDWARD J. MORAN.

REFERENCES CITED

The following references are of record in the file of this patent:

UNITED STATES PATENTS

| Number | Name | Date |
|---|---|---|
| 2,275,049 | Keller | Mar. 3, 1942 |
| 2,130,362 | Muncie | Sept. 20, 1938 |
| 1,452,093 | Pollack | Apr. 17, 1923 |
| 2,260,871 | Sawyer | Oct. 28, 1941 |

OTHER REFERENCES

Chemical Formulary—Bennett, vol. 4 (1939), pages 503 and 504.